United States Patent [19]
Trouilhet

[11] 3,760,247
[45] Sept. 18, 1973

[54] SINGLE-PHASE MOTOR WITH AUXILIARY COILS SELECTIVELY SHORT-CIRCUITED BY A SOLID STATE SWITCH ELEMENT

[75] Inventor: Maurice Marie Achille Trouilhet, Lyon, France

[73] Assignee: Calor, Lyon, France

[22] Filed: Nov. 10, 1971

[21] Appl. No.: 197,446

[30] Foreign Application Priority Data
Nov. 30, 1970 France .............................. 7047330

[52] U.S. Cl. .............. 318/221 E, 318/223, 318/227
[51] Int. Cl. ............................................. H02p 1/44
[58] Field of Search .................... 318/220 R, 221 R, 318/221 E, 223, 227

[56] References Cited
UNITED STATES PATENTS

| | | | |
|---|---|---|---|
| 2,019,323 | 10/1935 | Stark | 318/223 X |
| 3,573,579 | 4/1971 | Lewus | 318/221 E |
| 3,226,620 | 12/1965 | Elliott et al. | 318/221 E |
| 3,414,789 | 12/1968 | Prouty | 318/221 E |
| 2,341,482 | 2/1944 | Stephan | 318/223 |

*Primary Examiner*—Gene Z. Rubinson
*Attorney*—Francis T. Carr et al.

[57] ABSTRACT

A single-phase, asynchronous motor of the split-pole type is provided with wound shading coils which are temporarily short-circuited during starting operation by a controlled solid-state switching element, to which is applied a triggering signal derived from the current flowing through the stator winding.

17 Claims, 7 Drawing Figures

SINGLE-PHASE MOTOR WITH AUXILIARY COILS SELECTIVELY SHORT-CIRCUITED BY A SOLID STATE SWITCH ELEMENT

BACKGROUND OF THE INVENTION

The present invention relates generally to electric motors of the asynchronous type, supplied with single-phase alternating current, and concerns more particularly arrangements capable of facilitating the starting of such a motor without prejudice to its efficiency under normal operating conditions.

DESCRIPTION OF THE PRIOR ART

It is known that the starting, in a desired direction, of a single-phase asynchronous motor can be ensured only by artificial means whereby the alternating field peculiar to such motors is changed, at least during the starting, into a field revolving in the desired direction. Such artificial means generally involve the use of reactances associated with the motor, which either are cut off at the end of the starting or remain connected after the starting. In the first case, the motor must be provided with suitable switch means, the control of which is often of the centrifugal type and which complicate its structure and reduce its reliability in operation. In the second case, the reactances considerably reduce the major efficiency under normal operating conditions.

Among the known artificial means, one of those which are used most often consists in providing the motor with split stator-poles carrying an auxiliary winding or shading coil which is by-passed at least during the starting of the motor. As a result of induction, the said auxiliary winding creates an alternating field shifted in time and space with respect to the inducing field and which combines with the latter to create an elliptic field revolving in the desired direction. The said auxiliary winding is most often constituted by low-impedance rings surrounding a portion of each inducing pole. A major drawback to this solution is that, although being highly favourable to a good starting of the motor, it results in a considerable reduction of the motor efficiency.

SUMMARY OF THE INVENTION

The present invention is therefore directed at providing a single-phase asynchronous motor of the type comprising split stator-poles carrying an auxiliary widing or shading coil which is by-passed at least during the starting of the motor, the latter being provided with arrangements capable of ensuring its starting in the desired direction and with a sufficient torque, without however resulting in a reduction of its efficiency at normal speed.

To this end and according to an essential feature of the invention, the said auxiliary winding is by-passed by at least one controlled solid-state switch element, to the control electrode of which is supplied a firing current which is substantially proportional to the current drawn by the motor stator winding and which, during the starting, reaches a sufficient value to fire the said solid-state element, and then, at the end of the starting, drops to an insufficient value.

Thus, the auxiliary winding is effectively by-passed when the motor draws a strong current, i.e., when it produces a small counter-electromotive force and therefore rotates at a low speed compared with the nominal or rated speed ; such conditions occur during the starting of the motor, to which the auxiliary winding can therefore efficiently contribute. On the contrary, when the motor rotates substantially at its nominal speed, the current drawn is considerably reduced, so that the said solid-state element, which is kept non-conductive, cuts off the auxiliary winding circuit, and the latter, although present, has no effect upon the operation of the motor, more particularly upon its efficiency.

According to other essential features of the invention, the said auxiliary winding is formed of pairs of coils connected in series with at least one solid-state switch element, the number of turns and the impedance of the said coils being advantageously so selected as to ensure the supply of the ampere-turns required during the starting, without the maximum value of the current flowing therethrough exceeding that which the solid-state element can withstand under steady operating conditions.

Moreover, a fuse is preferably connected in series with the said coils and solid-state switch element, the rating of the said fuse being at most equal to the maximum current which the solid-state element can withstand under steady operating conditions.

An obvious advantage of the arrangements just mentioned is that they ensure a perfect protection of the solid-state switch element against any risk of breakdown caused by overcurrent during the starting of the motor or resulting from an insulation fault in the auxiliary winding.

According to still other features of the invention, the firing current supplied to the control electrode of the solid-state switch element is provided by a potentiometer which is either directly inserted in series in the supply circuit of the motor stator winding or supplied by a current transformer inserted in series in this same circuit.

In the second case, the auxiliary winding may be electrically insulated from the supply circuit of the stator winding.

Obviously, such arrangements provide simple, sturdy and adjustable means of ensuring the required proportional relationship between the firing current and the stator winding supply current, and therefore of setting at will the speed which the motor must reach in order that its starting auxiliary winding may be cut off.

The controlled solid-state switch element may be constituted by either a bi-directional switch element, or TRIAC, or a uni-directional switch element protected by a diode.

In the first case, a maximum motor starting torque is obtained, whereas in the second case the relative reduction of this torque is attended by a considerable reduction of the cost of the device.

In certain particular cases, the auxiliary winding of the motor may be by-passed by two unidirectional switch elements connected in parallel, poled in mutually opposite directions and each provided with a separate control circuit.

BRIEF DESCRIPTION OF THE DRAWINGS

Other features and advantages of the invention will appear more clearly from the following detailed description of several non-limitative examples of embodiment illustrated by the appended drawings wherein.

DESCRIPTION OF THE PREFERRED EMBODIMENT

Figure 1:
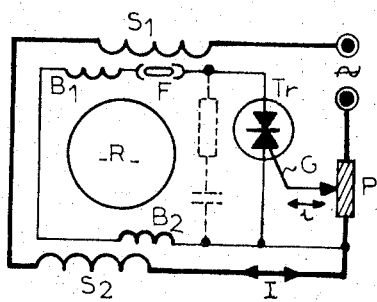
FIGS. 1 to 4 show the diagrams of four forms of embodiment of the invention using bi-directional switch elements or TRIAC.

The bipolar motor, the diagram of which is shown in FIG. 1, comprises a short-circuited rotor R rotating in the field of a stator winding S1–S2 formed of two symmetrical half-windings connected in series to the terminals of a single-phase a.c. source.

The inducing poles carrying respectively the stator windings S1–S2 are split and partially encircled by the symmetrical portions B1, B2 of a starting auxiliary winding, which are connected in series so as to form a closed circuit with a fuse F and a bi-directional semiconductor switch element or TRIAC Tr. The control electrode or firing gate G and the corresponding cathode of the latter are respectively connected to the slider and to one of the terminals of a potentiometer P inserted in series in the supply circuit of the stator winding S1–S2.

Thus, when a current I flows through the stator winding S1–S2, the control electrode G of the bi-directional switch element Tr is supplied with a proportional current $i$, the coefficient of proportionality depending upon the position of the slider of the potentiometer P. The said position is selected so that the current $i$ may be sufficient to fire the switch element Tr during the starting stage while the motor rotating at low speed produces a small counter-electromotive force and therefore draws a strong current I ; the position of the slider of the potentiometer P is also selected so that at the end of the starting the current $i$ proportional to the nominal value of the current drawn by the motor be insufficient to fire the bi-directional switch element Tr. Thus, the latter is selectively driven into conduction or kept non-conductive according to whether the motor is being started or has reached a given speed approximating to its nominal speed.

The coils B1–B2 of the starting auxiliary winding are advantageously constituted by several wire turns, so as to be capable of producing the magneto-motive force required for a good starting of the motor, taking into account the structure of the rotor R, without the current passing through the said coils exceeding the value permitted by the switch element Tr under steady operating conditions. Otherwise stated, the coils B1–B2 must be capable of supplying the required number of ampere-turns and their impedance must be high enough to limit the strength of the current flowing therethrough under any circumstances to a value compatible with the characteristics of the switch element Tr. Indeed, owing to the time lag of the fuse F on overload, it cannot ensure by itself a reliable protection of the switch element Tr, for instance in case of stoppage of the motor caused by an excessive resisting moment, the said stoppage causing a strong current I to be drawn and therefore a sufficient current $i$ to be supplied to the firing gate G of the switch element Tr to drive the latter into conduction. An additional protection of the bi-directional switch element with respect to abrupt voltage and current variations may be ensured, in case of need, by a resistance-capacity circuit connected in parallel as shown in dashed lines.

The device of FIG. 1 is perfectly suitable where the voltage range is not too high and in case the auxiliary winding B1–B2 is properly electrically insulated with respect to the stator. Under the same voltage conditions, but in case of a less reliable insulation of the auxiliary winding B1–B2, the device of FIG. 2 may be advantageously used.

In this device, the firing gate G of the bi-directional switch element Tr is fed by a potentiometer P' which is itself supplied by the secondary winding of a current transformer J, the primary winding of which is connected in series in the supply circuit of the stator winding S1–S2. Thus, the circuit of the auxiliary winding B1–B2 and the control circuit of the switch element Tr are perfectly insulated from the stator winding S1–S2.

Figure 3:
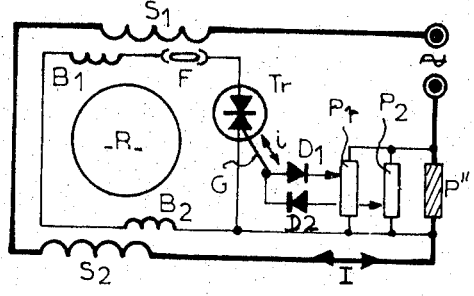
Figure 4:
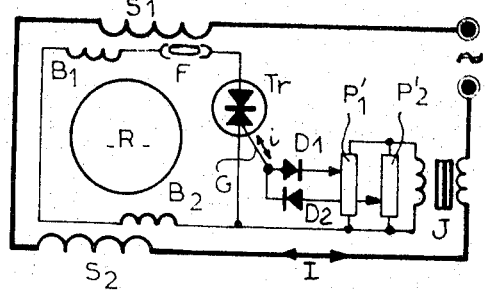

In case of higher voltage variation ranges, the devices of FIGS. 3 and 4 are used advantageously.

The device of FIG. 3 is similar to that of FIG. 1, except that the firing gate G of the bi-directional switch element Tr comprises two biasing circuits, each of which is formed of a diode D1, D2 connected to the slider of a potentiometer P1, P2, the said diodes being poled in mutually opposite directions, whereas the said potentiometers are connected in parallel with a fixed resistance P" mounted in series, in the same manner as the potentiometer P in the supply circuit of the stator winding S1–S2.

Figure 2:
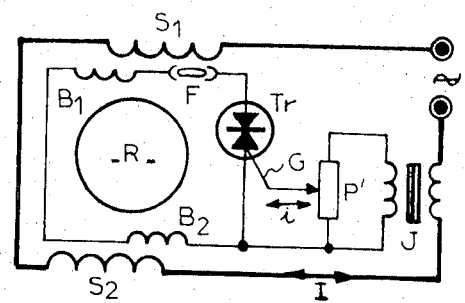

The device of FIG. 4 includes the same modification with respect to the device of FIG. 2, the firing gate G of the switch element Tr being connected by diodes D1, D2 to the sliders of the potentiometers P'1, P'2 supplied in parallel from the secondary winding of a current transformer J, the primary winding of which is connected in series with the stator winding S1–S2.

Figure 5:
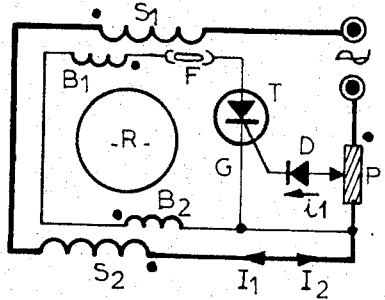
FIGS. 5 to 7 show the diagrams of other forms of embodiment of the invention using unidirectional switch elements.
Figure 6:
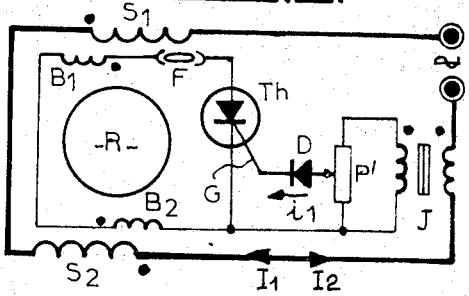

The devices of FIGS. 5 and 6 correspond respectively to those shown in FIGS. 1 and 2, but differ therefrom essentially in that the bi-directional semi-conductor switch element Tr is replaced by a uni-directional semiconductor switch element Th whose firing gate G is protected by a diode D. With the indicated coupling and wiring directions, the unidirectional switch element Th is therefore driven into conduction during only the half periods I1 of the supply current of the stator winding S1–S2. This, of course, results in a non-uniform starting torque whose value is half that of the previous one, owing to the fact that the auxiliary winding B1–B2 is closed only during the half periods in a given direction of the alternating supply current ; this drawback may however be acceptable under certain conditions of use, considering that the cost of a unidirectional switch element Th is much lower than that of a bi-directional switch element or TRIAC Tr.

Figure 7:
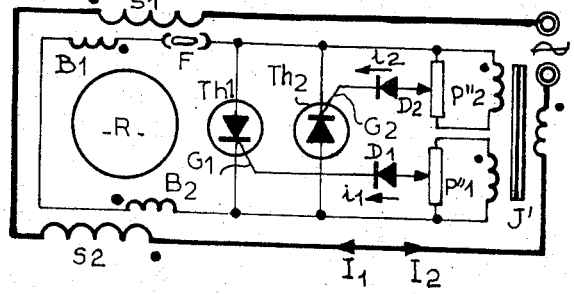

The device of FIG. 7 is applicable to all cases where maximum starting torque is necessary but two separate control circuits are required.

This device comprises two unidirectional switch elements Th1, Th2 connected in parallel, poled in mutually opposite directions and whose respective control electrodes G1, G2 are connected, through the medium of diodes D1, D2 poled in one and the same direction, to the sliders of potentiometers P'1, P'2 supplied respectively from two separate secondary windings of a current transformer J' whose primary winding is connected in series with the stator winding S1–S2. In the indicated wiring and coupling directions, the switch elements Th1 and Th2 are alternately driven into conduction during the half periods I1 and I2 of the supply current of the stator widing S1–S2.

From the examples of embodiment described and illustrated, it appears that the invention enables a single-phase asynchronous motor to be imparted the same starting torque as that of a motor of the same type equipped with conventional starting rings, while at the same time ensuring a much higher efficiency. The consequential advantages offered by the invention consist in that the auxiliary winding may be made from thin wire, thus considerably reducing its overall dimensions, and that its switching is obtained by means of a controlled solid-state switch element of higher reliability and smaller overall dimensions than those of a conventional electromechanical relay. As a result, the invention enables the dimensions of a motor to be reduced, as compared with those of a motor of the same power provided with low impedance rings, and the cost of the motor to be reduced owing to the simplicity of the devices used, which besides enable the switching threshold to be adjusted at will. In addition, the said devices occupy less space and are less expensive than those using a phase-shifting capacitor.

Of course, the invention is by no means limited to the forms of embodiment described and illustrated which have been given by way of example only. In particular, it comprises all the means constituting technical equivalents to the means described as well as their combinations, should the latter be carried out according to the spirit of the invention.

What is claimed is:

1. A single-phase asynchronous motor, comprising:
   a stator provided with a plurality of split poles, each of which carries a respective field-inducing main winding and is partially encircled by a respective flux-shading auxiliary winding consisting of a plurality of turns of a single wire;
   a short-circuited rotor operatively mounted for rotation in said stator;
   power circuit means operatively connecting said main windings to the terminals of an a.c. single-phase power supply;
   starting circuit means connecting serially said auxiliary windings in closed loop with at least one solid-state switch element having a control electrode and adapted to selectively short-circuit said serially connected auxiliary windings upon application to said control electrode of a firing current exceeding a predetermined value; and
   control circuit means including an adjustable current divider operatively connected to said switch element and to said power circuit means for supplying to said control electrode of said switch element a firing current substantially proportional to the current in said power circuit means, said current divider being set so that said firing current exceeds said predetermined value by the starting of said motor and then drops below said value at the end of said starting.

2. A motor according to claim 1, wherein the impedance of said starting circuit means and the total number of turns of said auxiliary windings allow for induction therein of a current sufficient to provide the ampere-turns required by the starting of said motor but prevent the maximum value of the current induced through said starting circuit means from exceeding that which said switch element can withstand under steady operating conditions.

3. A motor according to claim 2, wherein said starting circuit means additionally includes a fuse, whose rating is at most equal to the maximum value of the current which said switch element can withstand under steady operating conditions.

4. A motor according to claim 1, wherein said starting circuit means includes a resistance-capacity circuit by-passing said switch element and operative to clamp abrupt voltage and current variations.

5. A motor according to claim 1, wherein said starting switch element is a bi-directional semi-conductor switch or TRIAC, and wherein said current divider comprises a single potentiometer, to the slider of which said control electrode of said switch element is directly connected.

6. A motor according to claim 5, wherein said potentiometer is included in series in said power circuit means.

7. A motor according to claim 5, wherein said potentiometer is connected in parallel to a resistor included in series in said power circuit means.

8. A motor according to claim 5, wherein said potentiometer is fed by the secondary winding of a current transformer, the primary winding of which is included in series in said power circuit means.

9. A motor according to claim 1, wherein said switch element is a bi-directional semi-conductor switch or TRIAC, and wherein said current divider comprises a double potentiometer, to the sliders of which said control electrode of said switch element is connected through the intermediary of respective diodes poled in opposite directions.

10. A motor according to claim 9, wherein said potentiometer is included in series in said power circuit means.

11. A motor according to claim 9, wherein said potentiometer is connected in parallel to a resistor included in series in said power circuit.

12. A motor according to claim 9, wherein said potentiometer is fed by the secondary winding of a current transformer, the primary winding of which is included in series in said power circuit means.

13. A motor according to claim 1, wherein said switch element is a uni-directional semi-conductor switch or thyristor, and wherein said current divider comprises a single potentiometer, to the slider of which said control electrode of said control element is connected through the intermediary of a diode.

14. A motor according to claim 13, wherein said potentiometer is included in series in said power circuit means.

15. A motor according to claim 13, wherein said potentiometer is connected in parallel to a resistor included in series in said power circuit means.

16. A motor according to claim 13, wherein said potentiometer is fed by the secondary winding of a current transformer, whose primary winding is included in series in said power circuit means.

17. A motor according to claim 1, wherein said switch element consists of a pair of uni-directional semi-conductors switches or thyristors connected in parallel and poled in mutually opposite directions, and wherein said current divider comprises a pair of potentiometers respectively fed by separate secondary windings of a current transformer whose primary is included in series in said power circuit means, said control electrode of said switch elements being respectively connected to the sliders of said potentiometers through the intermediary of respective diodes.

* * * * *